United States Patent
Hyun

(10) Patent No.: US 9,658,768 B2
(45) Date of Patent: May 23, 2017

(54) METHOD OF CONTROLLING MOBILE TERMINAL

(71) Applicant: LG ELECTRONICS INC., Seoul (KR)

(72) Inventor: Juha Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/957,045

(22) Filed: Aug. 1, 2013

(65) Prior Publication Data

US 2014/0184530 A1 Jul. 3, 2014

(30) Foreign Application Priority Data

Jan. 3, 2013 (KR) .................. 10-2013-0000468

(51) Int. Cl.
*G06F 3/0488* (2013.01)
*G06F 1/16* (2006.01)
(Continued)

(52) U.S. Cl.
CPC ........ *G06F 3/04886* (2013.01); *G06F 1/1626* (2013.01); *G06F 1/1643* (2013.01); *G06F 3/0481* (2013.01); *G06F 3/04883* (2013.01); *H04N 21/41407* (2013.01); *H04N 21/4316* (2013.01); *H04N 21/4438* (2013.01); *G06F 2203/04803* (2013.01); *G06F 2203/04804* (2013.01); *H04M 2250/64* (2013.01); *H04N 5/445* (2013.01); *H04N 7/147* (2013.01)

(58) Field of Classification Search
CPC .. G06F 2203/04804; G06F 3/01; G06F 3/048; G06F 3/0481; G06F 3/04886; G09G 2340/12

USPC .................................................. 715/766, 768
See application file for complete search history.

(56) References Cited

U.S. PATENT DOCUMENTS 5,651,107 A 7/1997 Frank et al. .................. 395/344
6,429,883 B1 * 8/2002 Plow ..................... G06F 3/0481
715/768

(Continued)

FOREIGN PATENT DOCUMENTS

EP 2 466 438 A2 6/2012
WO WO 2006/021444 A2 3/2006

(Continued)

OTHER PUBLICATIONS

European Search Report dated Apr. 15, 2014 issued an Application No. 13 17 9417.

(Continued)

*Primary Examiner* — Li Sun
*Assistant Examiner* — Terri Filosi
(74) *Attorney, Agent, or Firm* — KED & Associates LLP

(57) ABSTRACT

There is disclosed a method of controlling a mobile terminal including steps of implementing a first application; implementing a second application during the implementation of the first application; and overlay-displaying by displaying a screen of the second application or the first application on a screen of the other, wherein a screen of the front application has implementable input and output function in a semitransparent state, and a screen of the rear application has a restricted input function and an implementable output function.

13 Claims, 16 Drawing Sheets

(51) Int. Cl.
*H04N 21/414* (2011.01)
*H04N 21/431* (2011.01)
*G06F 3/0481* (2013.01)
*H04N 7/14* (2006.01)
*H04N 5/445* (2011.01)
*H04N 21/443* (2011.01)

(56) References Cited

U.S. PATENT DOCUMENTS

| | | | |
|---|---|---|---|
| 2006/0294475 A1* | 12/2006 | Holecek | G06F 3/0481 715/781 |
| 2008/0163082 A1* | 7/2008 | Rytivaara | 715/762 |
| 2008/0297483 A1* | 12/2008 | Kim | G06F 3/04817 345/173 |
| 2008/0307352 A1* | 12/2008 | Chaudhri | G06F 3/048 715/788 |
| 2011/0029907 A1* | 2/2011 | Bakhash | 715/769 |
| 2011/0302515 A1* | 12/2011 | Kim | 715/768 |
| 2013/0104065 A1* | 4/2013 | Stecher | G06F 3/0481 715/767 |
| 2014/0115480 A1* | 4/2014 | Lundgren | G06F 9/4443 715/733 |

FOREIGN PATENT DOCUMENTS

| | | |
|---|---|---|
| WO | WO 2008/081303 A2 | 7/2008 |
| WO | WO 2011/059250 A2 | 5/2011 |

OTHER PUBLICATIONS

European Search Report issued in Application No. 13179417.4 dated Jun. 12, 2014.

* cited by examiner (a)

(b)

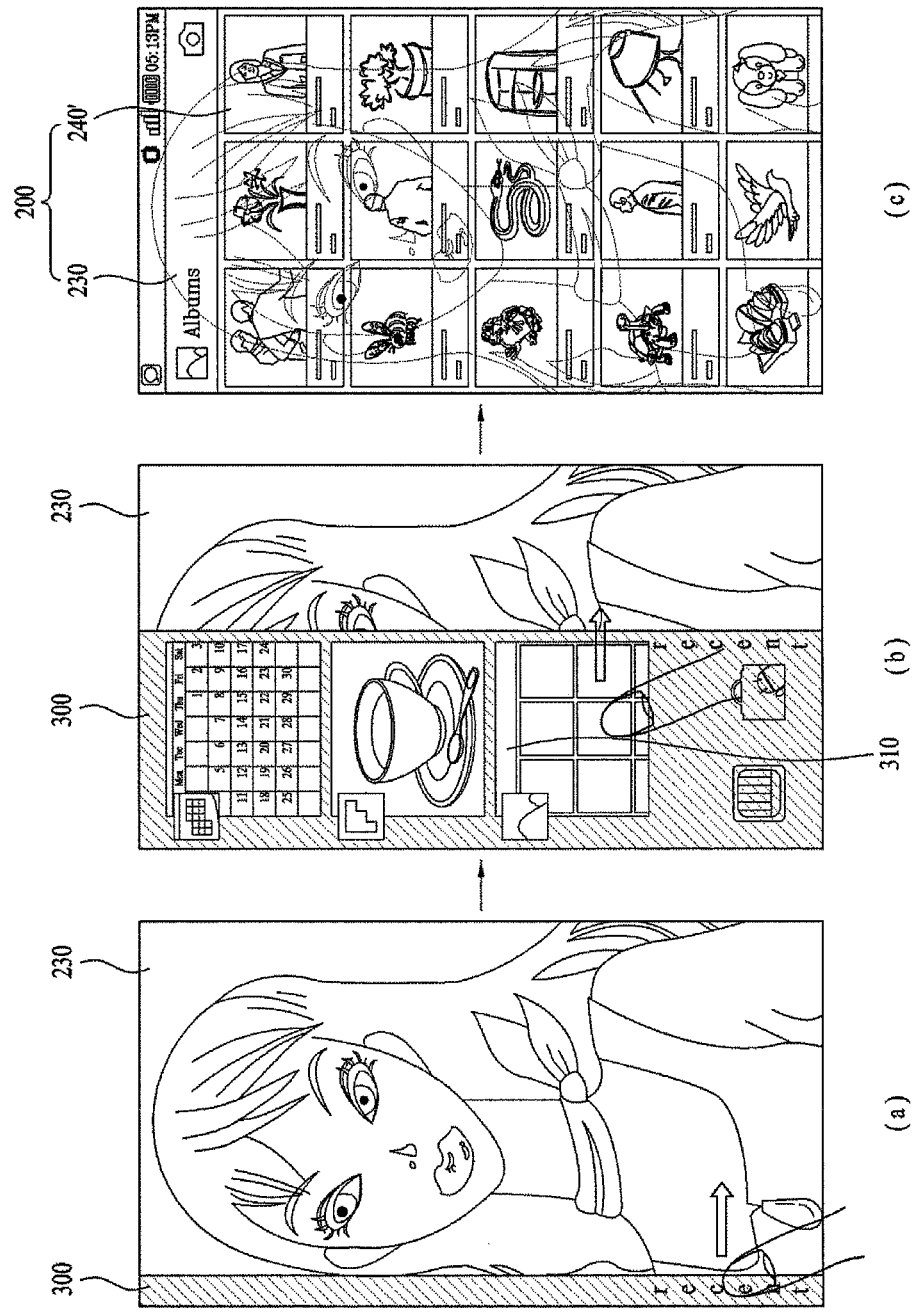

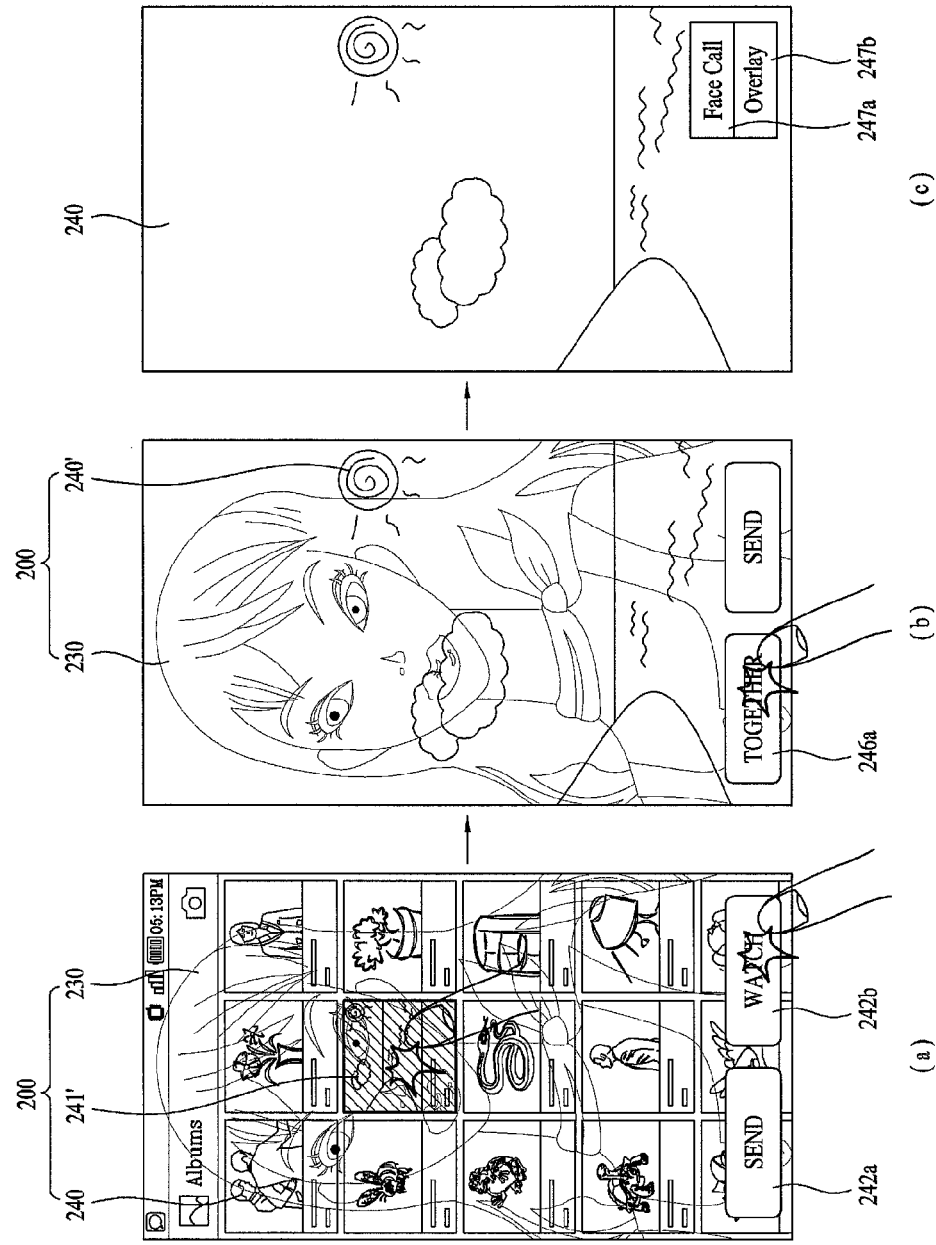

(a)   (b)

METHOD OF CONTROLLING MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2013-0000468, filed on Jan. 3, 2013, the contents of which are hereby incorporated by reference herein in their entirety.

BACKGROUND

1. Field

The present invention relates to a method of controlling a mobile terminal that is able to implement two processes simultaneously or continuously, using a plurality of screens output on a display unit simultaneously.

2. Background

Terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

Recently, one or more applications are used simultaneously or continuously as functions provided in a mobile terminal are diversified. However, the size of a screen displayed on the mobile terminal is limited and only one application is output on the screen at one time. Accordingly, a conventional mobile terminal has a disadvantage of ending the application implemented on the screen to implement another application.

SUMMARY OF THE DISCLOSURE

Accordingly, the present invention is directed to a method of controlling a mobile terminal that substantially obviates one or more problems due to limitations and disadvantages of the related art. An object of the present invention is to provide a method of controlling a mobile terminal that is able to display a plurality of screens on a display unit provided therein to implement two programs simultaneously or continuously.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a method of controlling a mobile terminal includes steps of: implementing a first application; implementing a second application during the implementation of the first application; and overlay-displaying by displaying a screen of the second application or the first application on a screen of the other, wherein a screen of the front application has implementable input and output function in a semitransparent state, and a screen of the rear application has a restricted input function and an implementable output function.

The second application implementing step may output a noticing message window during the implementation of the first application and implement the second application by activating the noticing message window.

The second application implementing step may open an application list and implement the second application by selecting the second application from the application list.

The overlay-displaying step may further include steps of outputting a state bar configured to show and adjust a transparency of the screen, and adjusting a transparency of the screen of the front application by adjusting the state bar.

The adjusting a transparency step may further include steps of controlling a screen of the rear application to disappear and only a screen of the front application to be displayed, when the transparency is adjusted 0%; and controlling the screen of the front application to disappear and only the screen of the rear application to be displayed, when the transparency is adjusted 100%.

The adjusting a transparency step may further include steps of ending the implementation of the rear application, when the transparency is adjusted 0%; and ending the implementation of the front application, when the transparency is adjusted 100%.

The first application is a video call and the second application may include an image or data file, and the method of controlling mobile terminal may further include a step of transmitting the image or data file to the person on the other end of the video call, when an image or data file is selected from a screen of the second application.

The first application may be a video call, and the method of controlling mobile terminal may further include a step of sharing the screen of the second application with a person on the other end of the video call.

The sharing step may control the display unit to display only the screen of the second application.

The overlay displaying step may further include displaying the screen of the second application in front of the screen of the first application, in a semitransparent state.

The method of controlling mobile terminal may further include a step of selecting the order of the overlaid screens of the first and second applications.

The overlay order selecting step may include steps of displaying a lateral side of an overlay structure by tilting the screen of the first application and the screen of the second application; and changing the order of the screens by dragging the screen of the first application or the screen of the second application.

The overlay order selecting step may change the order of the screen of the first application and the screen of the second application by flicking the display unit.

The method of controlling mobile terminal may further include steps of flicking the display unit; and controlling the screen of the front application to disappear from a display unit; and displaying only the screen of the rear application on the display unit, the steps implemented after the overlay displaying step.

The method of controlling mobile terminal may further include steps of flicking the display unit after the step of displaying only the screen of the rear application and displaying the disappeared screen of the front application in front of the screen of the rear application in a semitransparent state.

The method of controlling mobile terminal may further include a step of dividing the display unit into predetermined sections and outputting the screen of the first application and the screen of the second application on the divided sections, respectively, after the overlay displaying step.

Effects and/or advantages obtainable from the present invention are non-limited the above mentioned effect. And, other unmentioned effects and/or advantages can be clearly understood from the following description by those having ordinary skill in the technical field to which the present invention pertains.

BRIEF DESCRIPTION OF THE DRAWINGS

The embodiments will be described in detail with reference to the following drawings in which like reference numerals refer to like elements wherein:

FIGS. 6A to 6D are plane diagrams illustrating a third embodiment of the overlay display according to the method of controlling the mobile terminal;

DETAILED DESCRIPTION

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification may also be applicable to a fixed terminal such as a digital TV, a desktop computer and the like as well as a mobile terminal.

Figure 1:
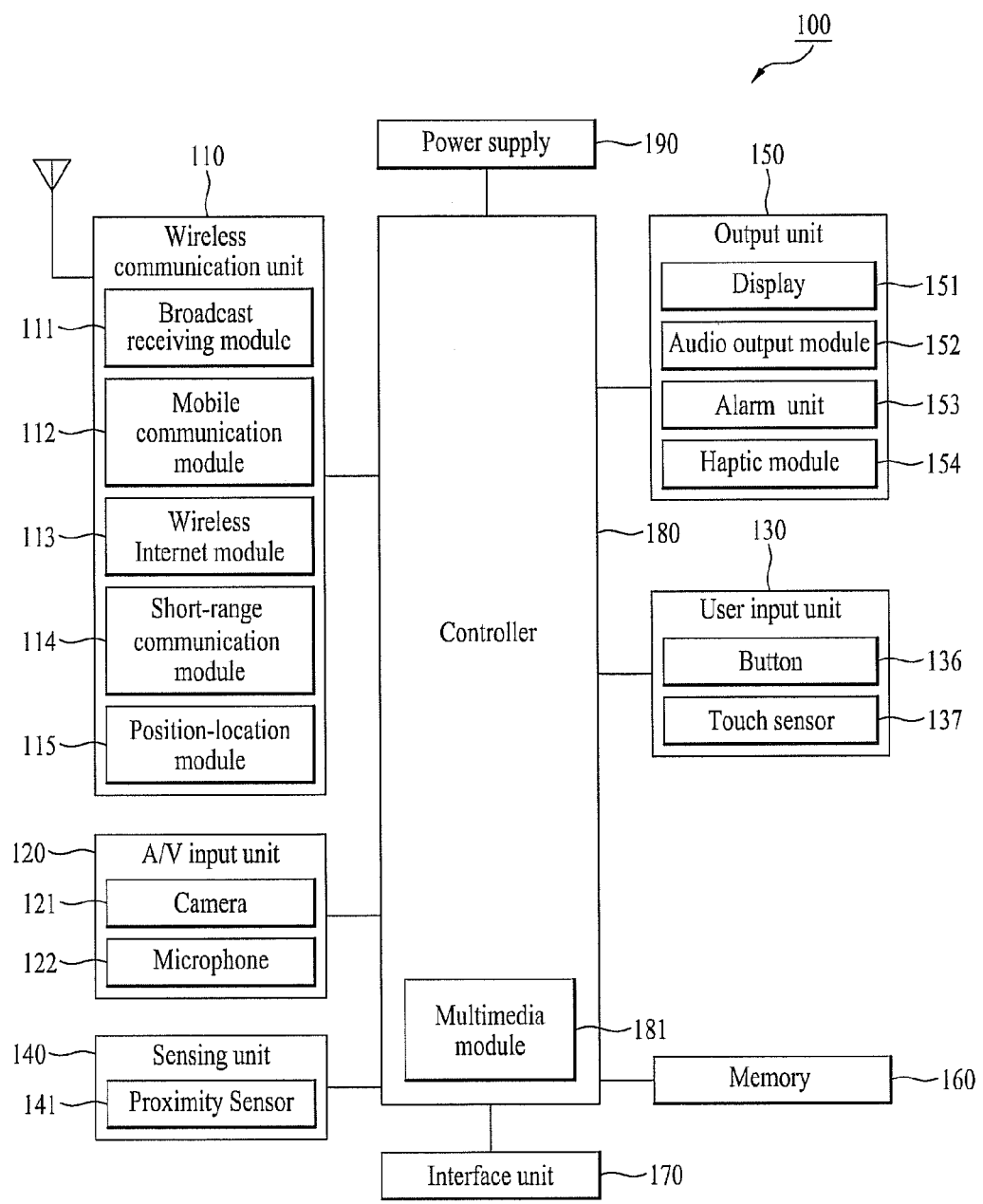
FIG. 1 is a block diagram of a mobile terminal according to one embodiment that is applied to a method of controlling a mobile terminal according to the present invention.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such a sensing unit 140 may include, a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
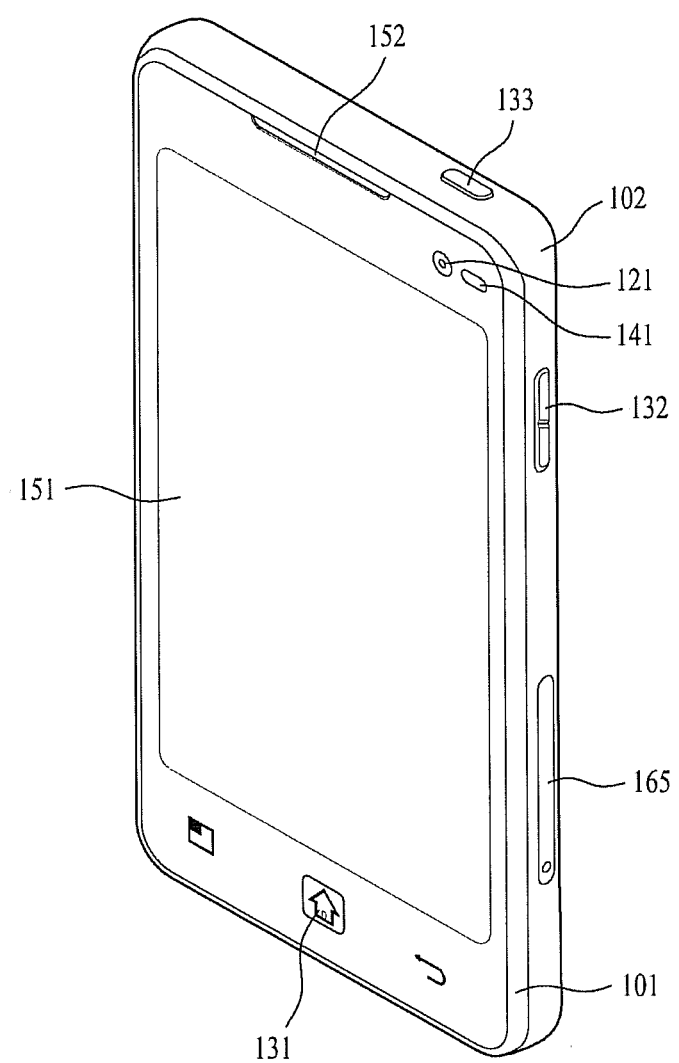
FIG. 2 is a front perspective diagram illustrating the mobile terminal according to one embodiment that is used in the method of controlling the mobile terminal according to the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touch-screen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover (see FIG. 3) configured to cover the surface of the rear case 102. In particular, the backside cover has a detachable configuration for the user's convenience. If the backside cover is detached from the rear case 102, the surface of the rear case 102 is exposed.

Figure 3:
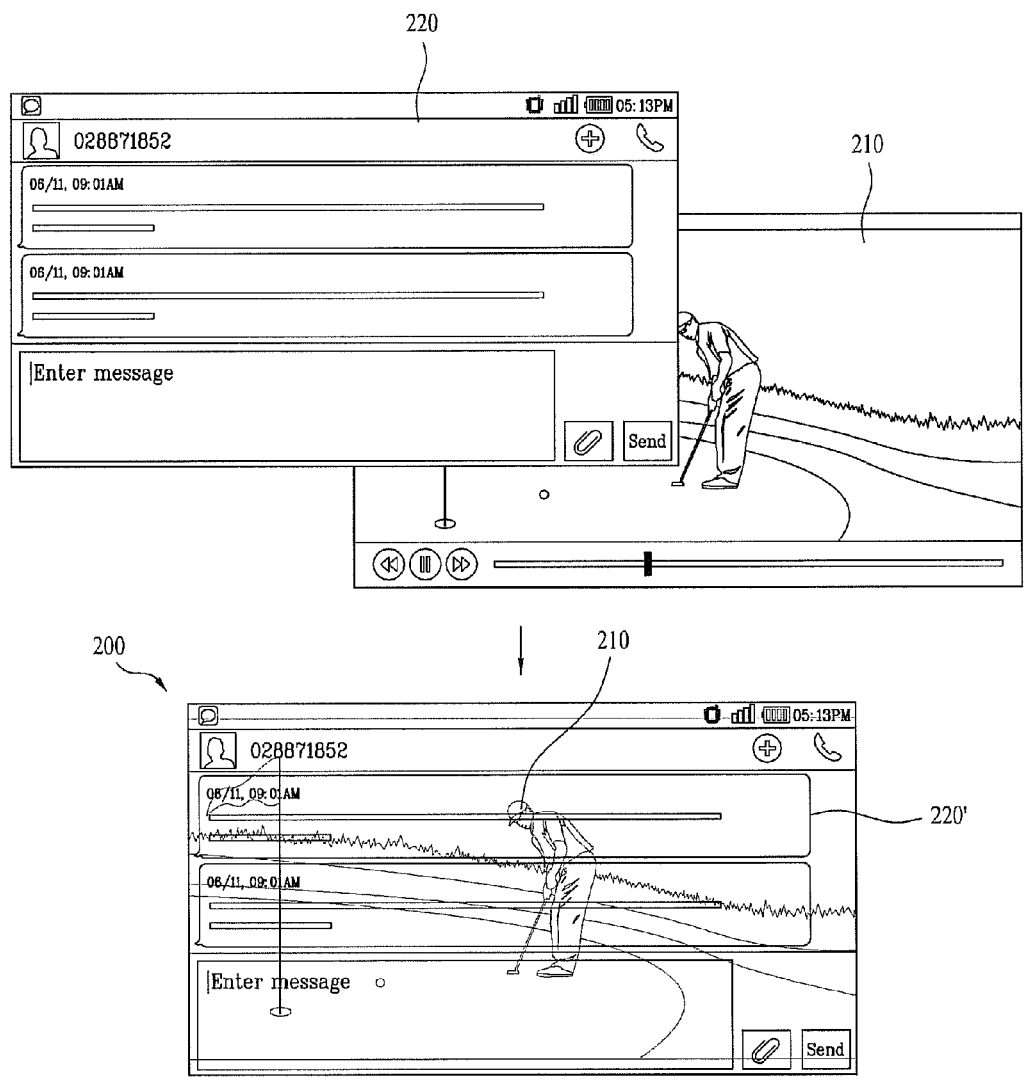
FIG. 3 is a plane diagram to describe a overlay display in the method of controlling the mobile terminal according to the present invention.

Referring to FIG. 3, if the backside cover is attached to the rear case 102, a lateral side of the rear case 102 may be exposed in part. If a size of the backside cover is decreased, a rear side of the rear case 102 may be exposed in part. If the backside cover covers the whole rear side of the rear case 102, it may include an opening'(see FIG. 4) configured to expose a camera 121' or an audio output unit 152' externally.

The cases 101, 102 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIG. 3 is a plane diagram to describe an overlay display according to a method of controlling a mobile terminal of the present invention. The expression of "overlay" is literally similar to covering. An overlay display 200 means that two screens 210 and 220 are overlapped or overlaid to be output. To output two screens on one display unit 151, two screens have to be overlaid and a screen 220' positioned in front is displayed in a state of being semitransparent.

When a second application is implemented during implementation of a first application, the first application may not end and the second application implemented later may be activated and output on the display unit 151, in a state of being overlaid on the screen of the first application.

The two applications may be applications configured to implement different functions or one same function. In case a message function is activated while a user is watching a video file, the first application and the second application implement different functions, respectively. In case of receiving a message from another person and implementing an instant messaging with the person while implementing an instant messaging with someone, the first application and the second application are applications configured to implementing the same functions.

At this time, a screen 220' displaying the application positioned in front may be input by the user and a screen 210 of the application position in the rear may not be input by the user but only be output. In other words, when the application positioned in the rear is a video file or video call, the video file is continuously playing and the video call is continued. At the same time, the second application is implemented to perform another process.

When desiring to make input to the rear screen, the user can change the screen position order of the overlaid applications to make the rear screen be the front screen and he or she can make input. The embodiment of changing the screen order will be described in detail, referring to FIGS. 7A to 7D.

Methods of the overlay displaying, screen order conversion of applications and mutual connection between the applications implementing simultaneously will be described in detail, referring to the drawings as follows.

Figure 4A:
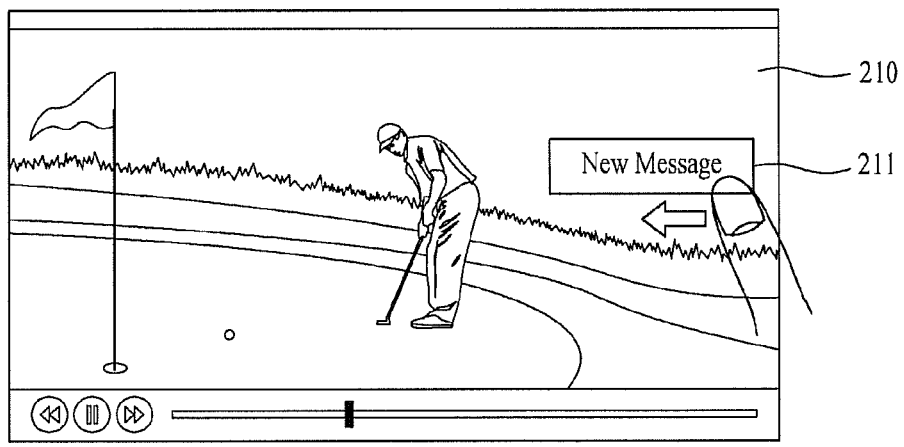
FIGS. 4A and 4B are plane diagrams illustrating a first embodiment of the overlay display according to the method of controlling the mobile terminal.
Figure 4A:
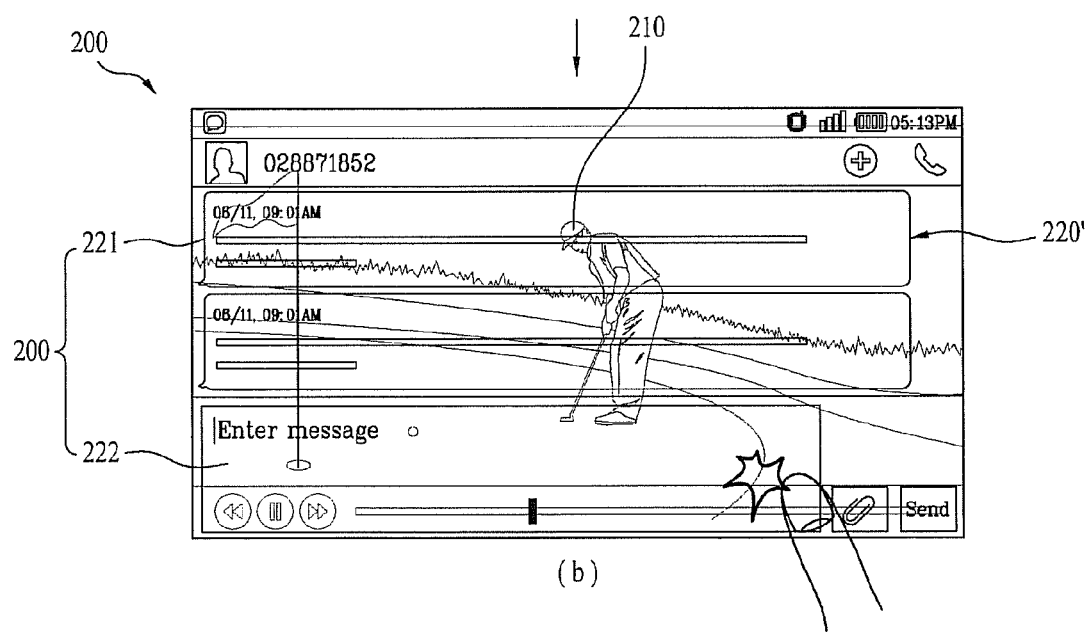
Figure 4B:
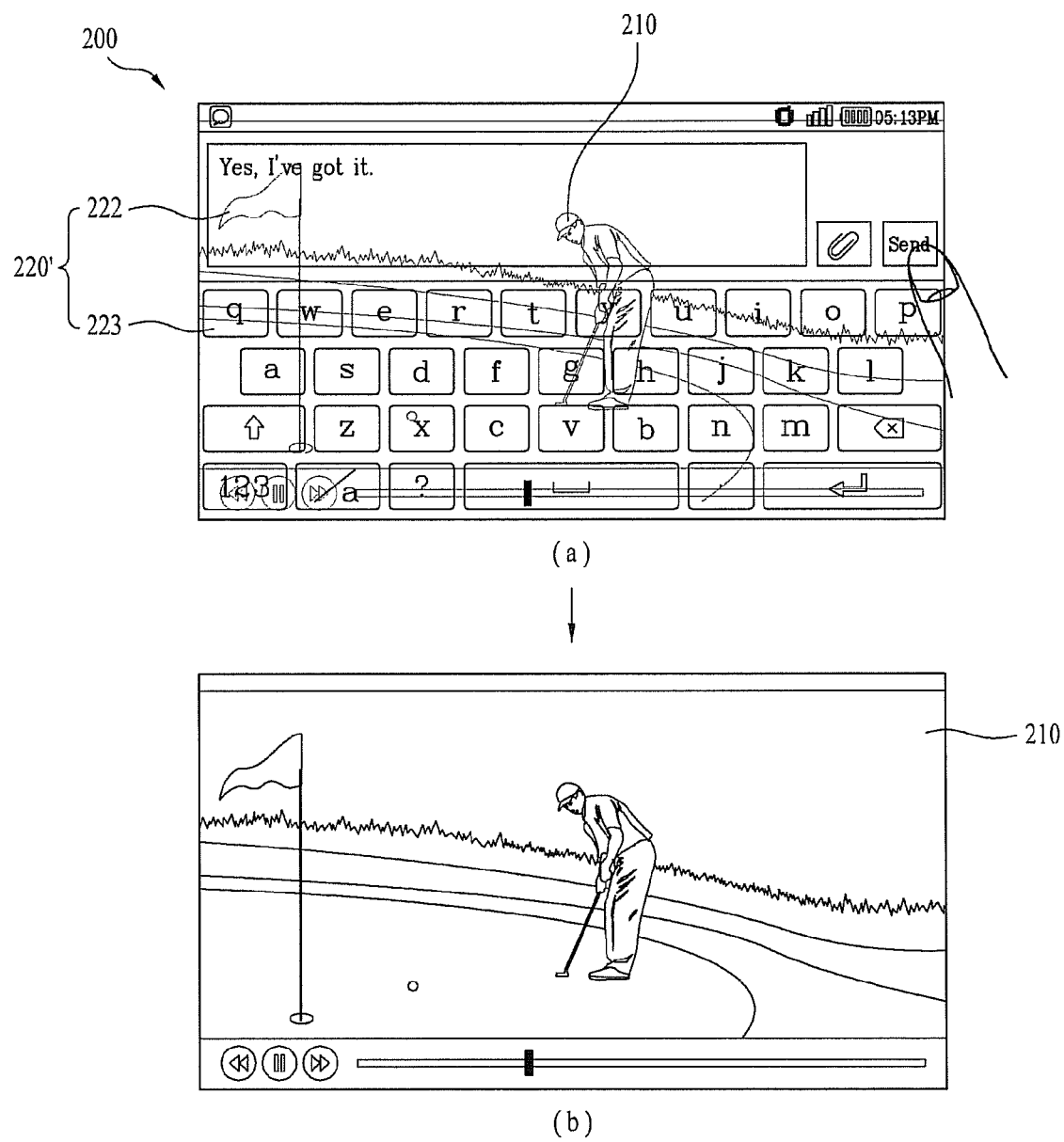

FIGS. 4A and 4B are plane diagrams illustrating a first embodiment of the overlay display according to the method of controlling the mobile terminal. The first embodiment shows a method of controlling when a notice message associated with a second application is received during the implementation of a first application.

In the drawing, the application implemented first, in other words, the first application is a video file application and the application implemented later, in other words, the second application is a message application. However, as mentioned before, the types of the first and second applications are not limited thereto.

When a message is received during the implementation of the first application, a noticing message window 211 is displayed on a screen 210 of the first application as shown in FIG. 4A (a). The noticing message window 211 is touched and the second application is implemented. After that, a semitransparent screen 220' of the second application is overlaid on the screen 210 of the first application as shown in FIG. 4A (b).

At this time, the first application is continuously implemented without pausing, only to output the video file on the first application screen 210 continuously. The second application screen 220' is in a semitransparent state, only to allow the user to check the message 221 while watching the video file.

The user can input characters to the message input window 222. When the message input window 222 is touched as shown in FIG. 4A (b), a text input keyboard 223 is displayed on the screen as shown in FIG. 4B (a).

When the user inputs and sends text, the second application need not be implemented any longer and it ends, such that the second application screen 220' may disappear to return to the first application screen 210 as shown in FIG. 4B (b). In case there is no need to replay the message, the user may only check the message and end the second application immediately, to return to the first application screen 210.

Figure 5A:
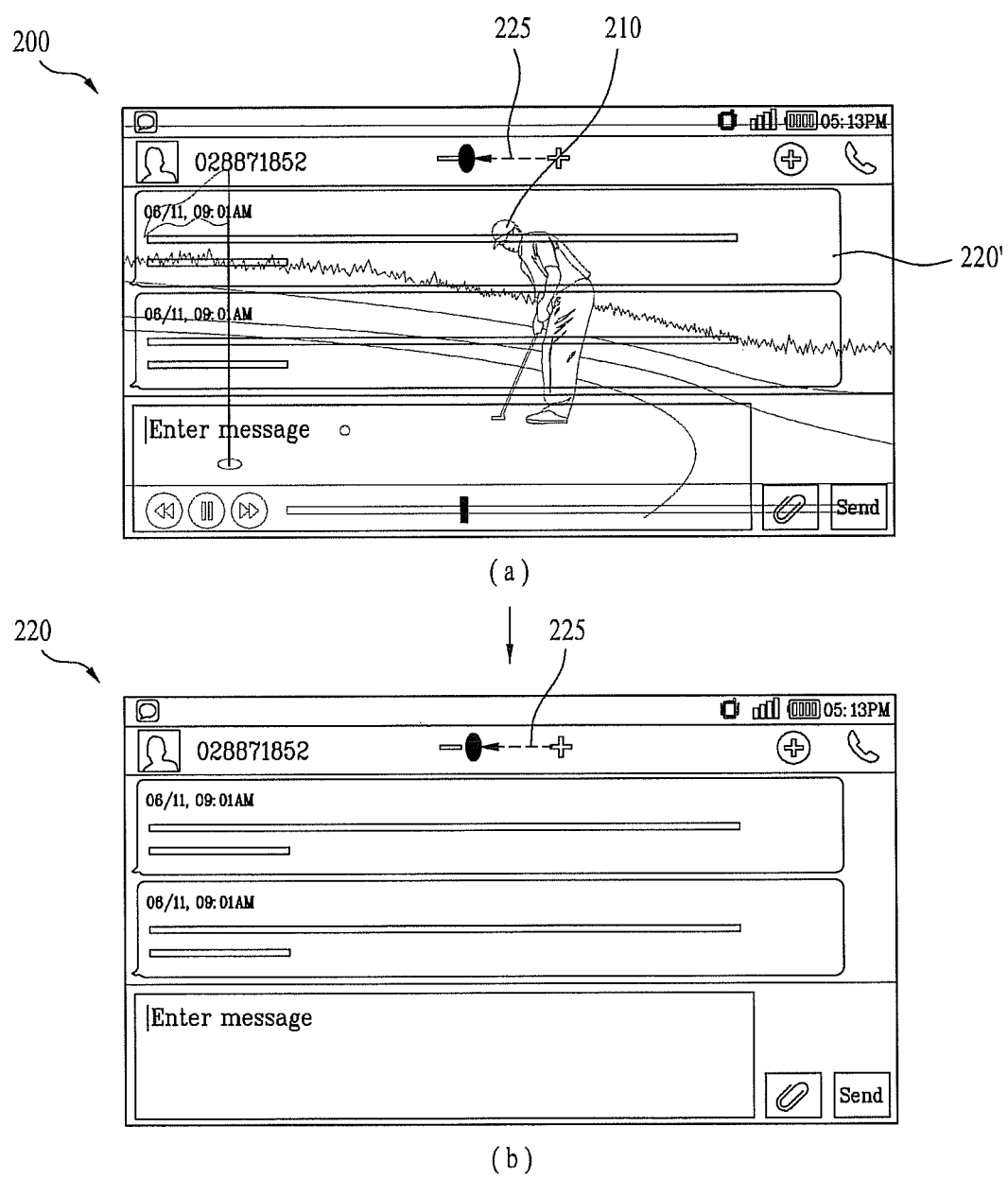
FIGS. 5A and 5B are plane diagrams illustrating a second embodiment of the overlay display according to the method of controlling the mobile terminal.
Figure 5B:
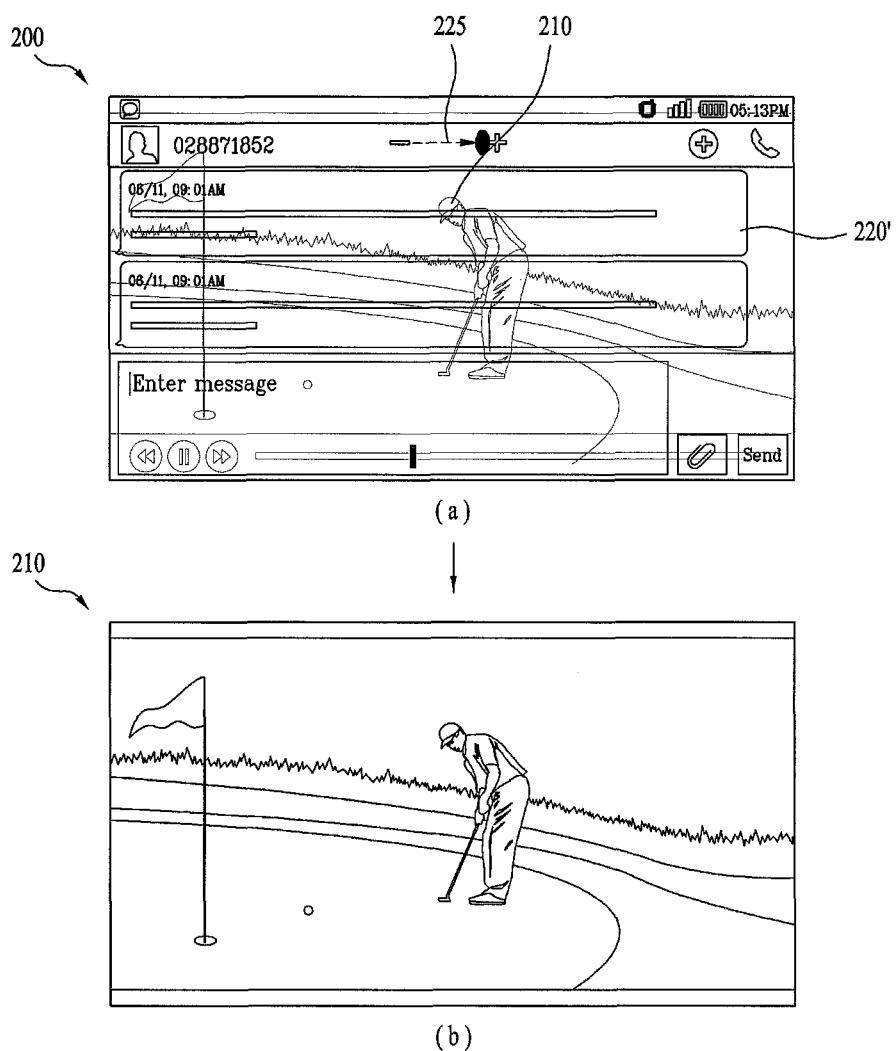

FIGS. 5A and 5B are plane diagrams illustrating a second embodiment of the overlay display according to the method of controlling the mobile terminal. In a state of overlay displaying, the display unit 151 may output a state bar 225 to adjust a transparency of the application screen positioned in front. A transparency level of the front application screen 220' is adjusted to make the rear application screen 210 visible more clearly.

When a transparency level of the front application screen 220' is lowered to 0% by operating the state bar 225 as shown in FIG. 5A, the screen of the front application is converted to be semitransparent and the screen 210 of the rear application disappears to output only the screen 220 of the front application. At this time, the rear application can be set to end.

In contrast, when a transparency level of the front application screen 220' is adjusted to 100% as shown in FIG. 5B, the screen 220' of the front application is converted to be transparent and the screen 220' of the front application disappears to output only the screen 210 of the rear application. At this time, the application can be set to end.

When the front or rear application is implemented only without output on the screen, the state bar 225 for adjusting the transparency can be displayed on the display unit 151 in a state of 0% or 100% (see, FIG. 5A (b)).

In contrast, when the front or rear application is input to end, the state bar 225 for adjusting the transparency may disappear from the screen as shown in FIG. 5B (b).

FIGS. 6A to 6E are plane diagrams illustrating a third embodiment of the overlay display according to the method of controlling the mobile terminal. In the drawings, the first application is a video call and the second application is a photograph gallery. However, the first and second applications are not limited thereto.

An application list 300 is open to select the second application, while the first application is implemented. The application list 300 may be an application list having a history of the currently implemented applications or a favorite applications list the user uses frequently. As shown in FIG. 6A, a list hidden in a predetermined area is dragged and displayed on the screen or a specific button is pushed to display an application list 300.

Applications 310 listed on the application list 300 may be displayed in a thumbnail mode as shown in FIG. 6A. Optionally, the applications 310 may be simple icons or a text list.

One of the applications 310 is selected from the list 300 as the second application and implemented. After that, the second application screen 240' that is semitransparent may be overlaid 200 on the first application screen 230 implemented before as shown in FIG. 6A (c).

Dragging or short-touching may be used in implementing the applications 310 listed on the application list 300 as shown in FIG. 6A (b).

Figure 6B:
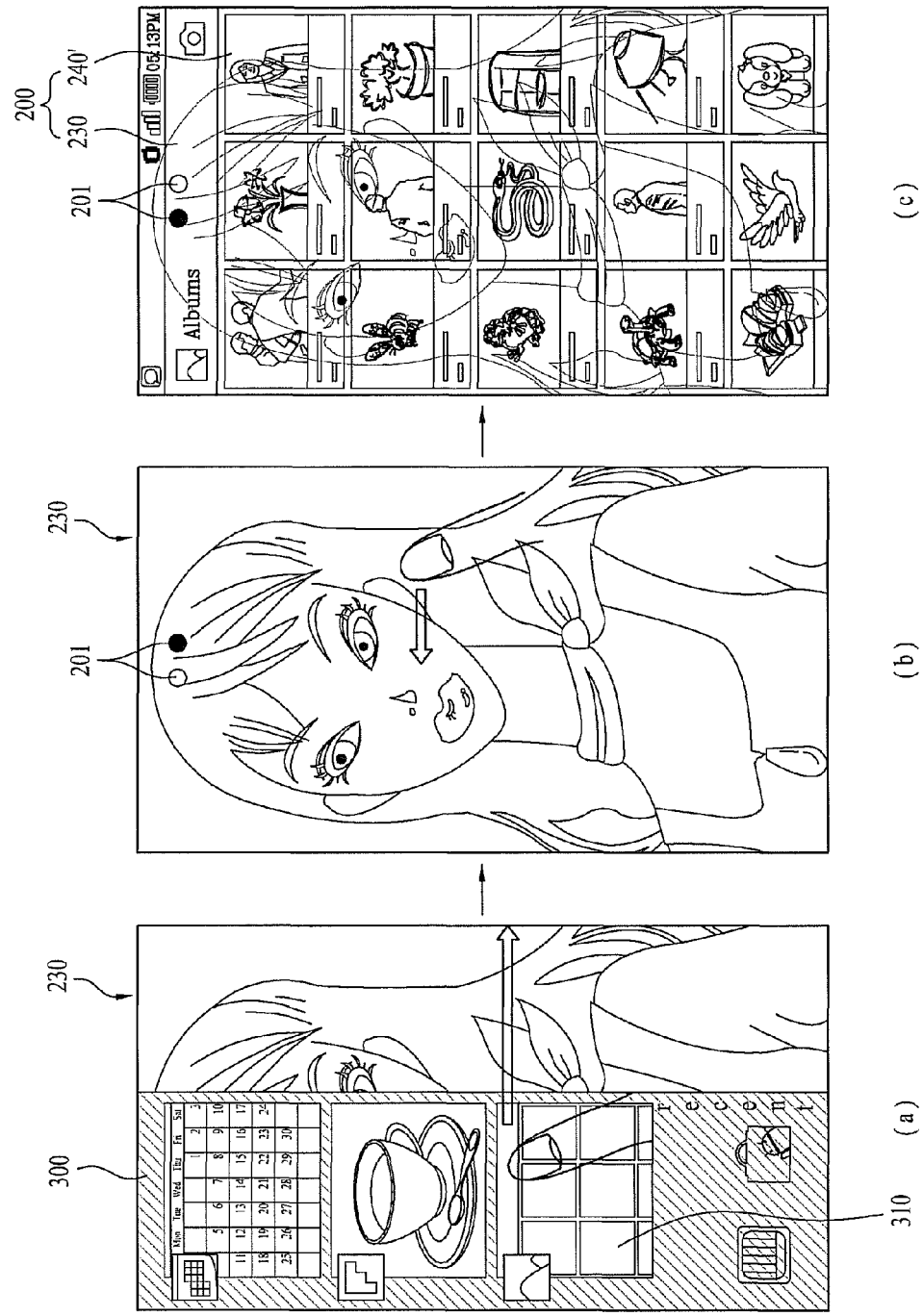

When the second application is implemented as shown in FIG. 6A, the semitransparent screen 240' of the second application may be overlay-displayed 200 in front of the screen 230 of the first application. However, when an additional gesture such as flip is input with maintaining the screen 230 of the first application as shown in FIG. 6B, the semitransparent screen 230' of the second application may be overlay-displayed on the screen 230 of the first application.

An indicator 201 may be further provided to indicate implementation of the second application that is able to be overlay-displayed although not overlay-displayed immediately after implemented.

The indicator 201 indicates that there is the screen that is able to be overlay-displayed and notices to the user that the display unit 151 can be controlled to output only the screen of the rear application in the state of overlay-displaying the screen. As shown in FIG. 6B, the indicator 201 may be displayed as two spots or a text message.

When the selected application is dragged to a central area of the display unit 151 as shown in FIG. 6A (a), the second application is implemented and overlay-displayed 200 immediately. When the selected application is dragged to an edge area of the display unit as shown in FIG. 6B (a), the screen 230 of the first application is maintained even with implementing the second application. An overlay display mode can be selected to overlay-display the second application after an additional gesture.

Figure 6C:
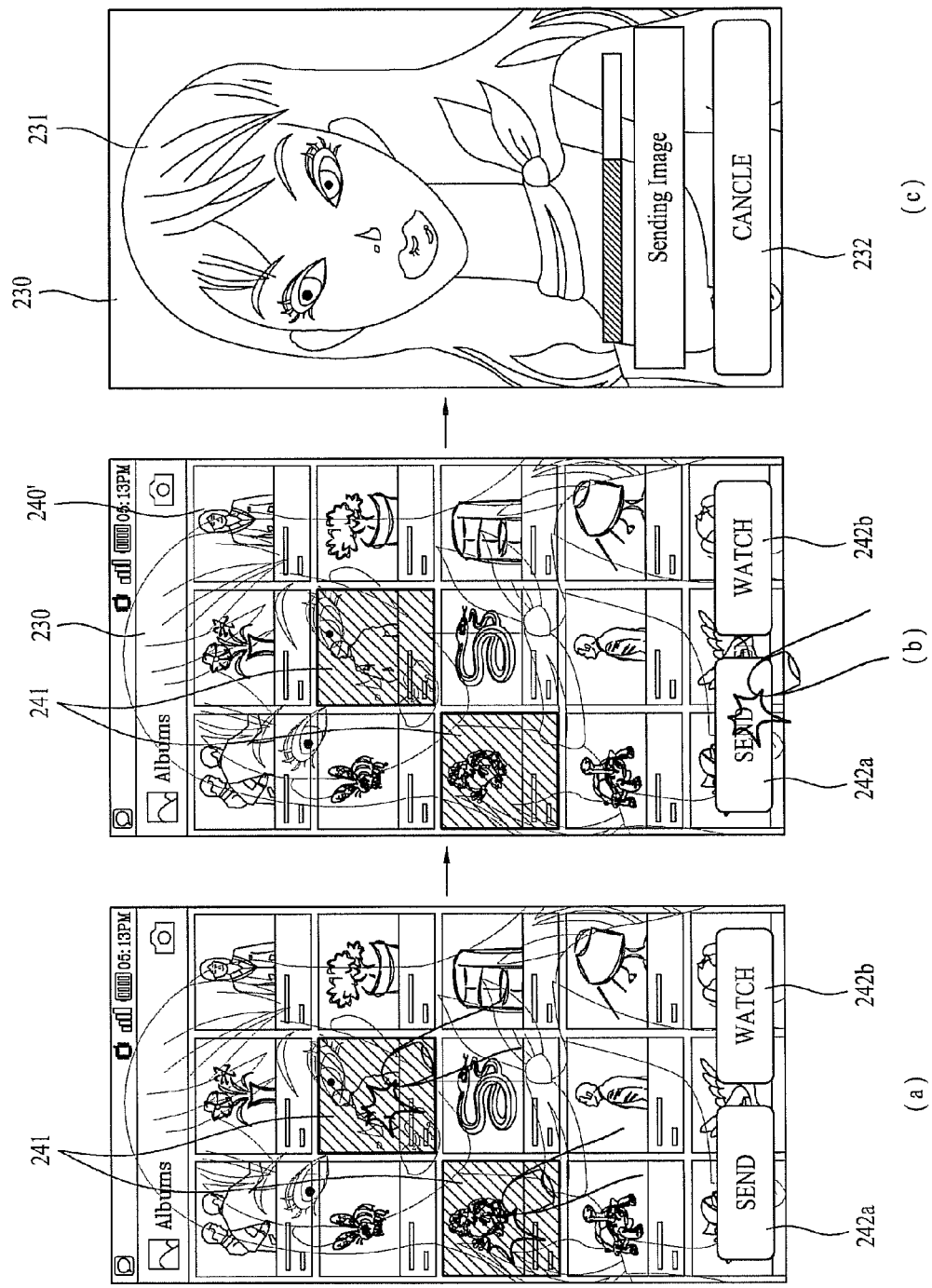

During the video call, the second application is implemented and the semitransparent screen 240' of the second application may be overlay-displayed 200 in front of the screen 230 of the first application as shown in FIG. 6C. In case the second application includes a file 241, the file 241 can be transmitted to the person on the other end of the video phone. The file 241 may include an image file as shown in the drawing or a data file and examples of such a data file includes a music file and a text.

Once one or more of the files 241 are selected and a send button 242a is pushed, the selected files may be transmitted to the person on the other end of the video call. The transmission of the file is completed and the second application is ended after that as shown in FIG. 6C (c). A transmission state may be displayed and a cancel button 232 may be provided for the user to cancel the transmission in the middle of the transmission.

Alternatively, the second application is implemented during the video call (the implementation of the first application) and the semitransparent screen 240' of the second application is overlay-displayed in front of the screen 230 of the first application. In this instance, the user and the person on the other end of the video call can see the screen 240' of the second application as shown in FIG. 6D. In case the second application is a photograph album as shown in FIG. 6D, the user can select and push a button 242b to see one photograph on the screen 240' of the second application. Also, the user can push a button 246a to share the screen 240' of the second application with the person on the other end of the video call.

The screen 240' of the second application shared with the person on the other end of the video call is not limited to the images and it may be a video file, a memo pad.

On the video call, it is more important to share the screen 240' of the second application than to see the faces on the screen 230 of the first application. In a state of sharing the screen 240' of the second application with the person on the other end of the video call, the screen 230 of the first application, in other words, the screen of the video call is turned off and only the screen 240' of the second application can be displayed.

Once the screen sharing state is ended, the screen may return to the screen of the video call, in other words, the screen 230 of the first application or the overlay-displayed state (200), as shown in FIG. 6D (b). A video call button 247a is pushed to return to the video call screen 230 and an overlay button 247b is pushed to return to the overlay display 200 separately.

FIGS. 7A to 7D are plane diagrams illustrating a fourth embodiment of the overlay display according to the method of controlling the mobile terminal. In this embodiment, the order of the front application and the rear application can be changed.

Figure 7A:
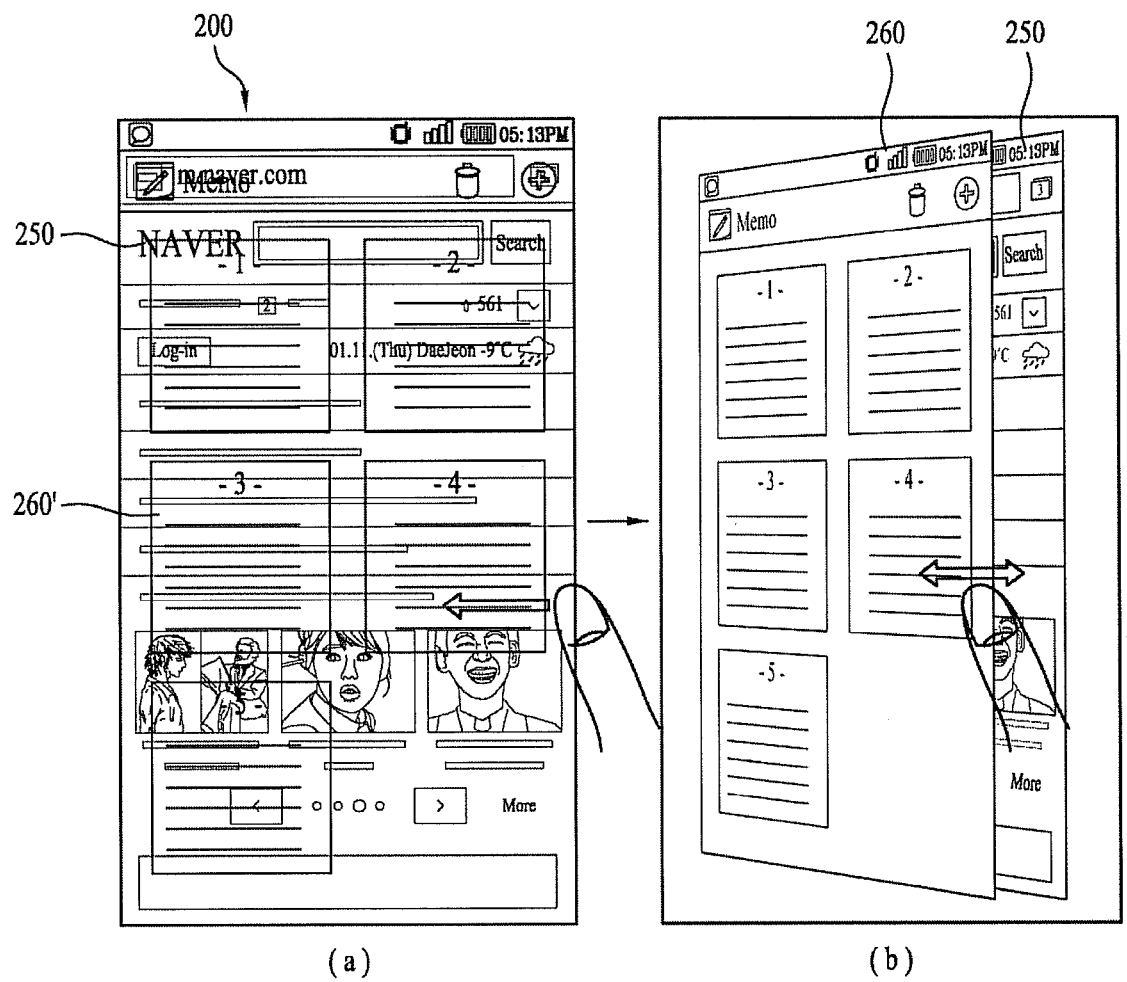
FIGS. 7A to 7D are plane diagrams illustrating a fourth embodiment of the overlay display according to the method of controlling the mobile terminal.

To change the order of screens 250 and 260 of the applications overlay-displayed (200) as shown in FIG. 7A, a lateral side of the structure having tilted screens 250 and 260 of the overlaid applications may be controlled to be visible. The shown lateral side is dragged from the overlaid structure and the order of the application screens 250 and 260 may be changed.

As shown in FIG. 7A (a), an edge area of the display unit 151 may be dragged to control the tilted overlaid structure be visible. However, the embodiment is not limited thereto and a specific pattern may be made on the display unit or a specific button may be pushed.

In the overlay-displaying state (200), the screen 260' of the front application can be changed into the screen 250 of the rear application. As shown in FIG. 7A (a), arrangement of the screens of the applications positioned in front and rear may be determined when the second application is implemented.

Figure 7B:
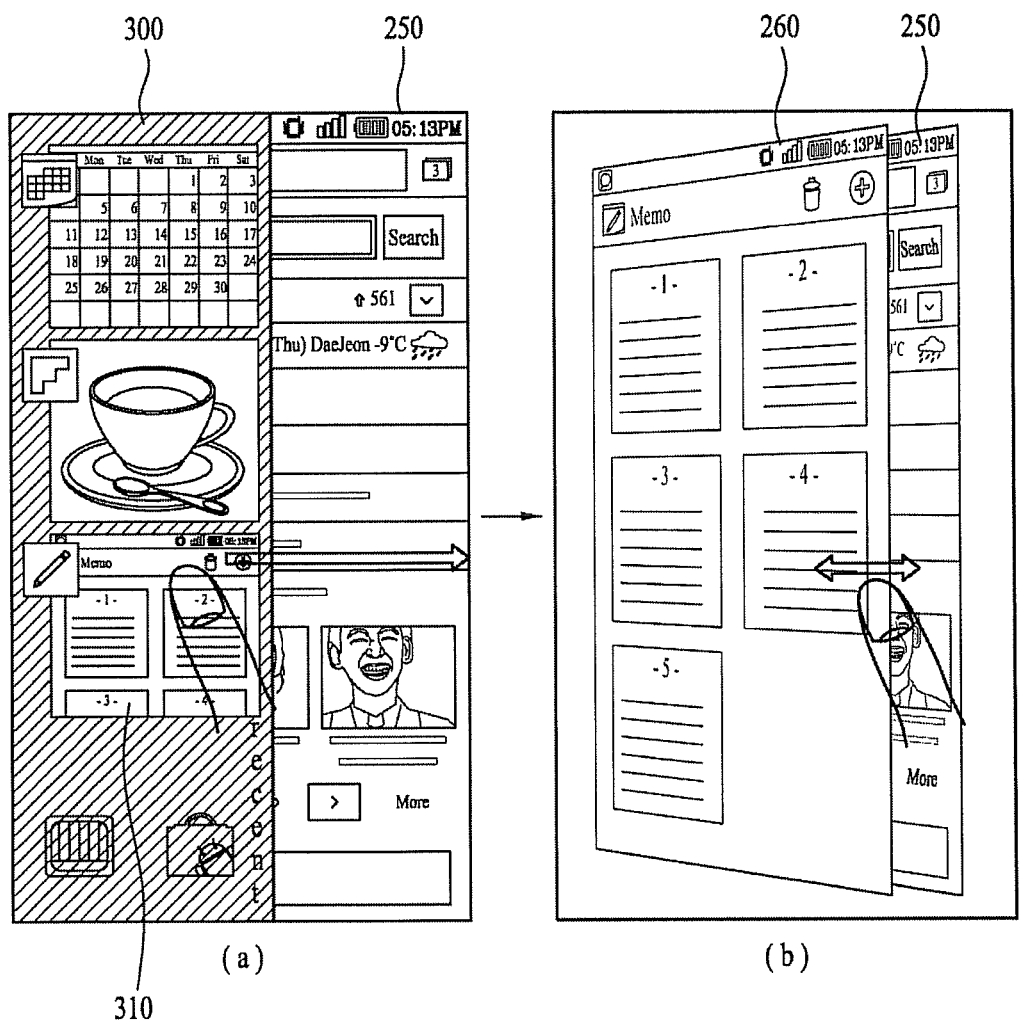

As shown in FIG. 7b, when an application 310 selected from the application list 300 is dragged to a central area of the display unit 151, the screen 260' of the second application is positioned in front and displayed on the display unit 151. However, when the application 310 is dragged to an edge area, the applications are tilted to show the overlaid structure of the application screens 250 and 260 and the order of the screens 250 and 260 may be selected.

Figure 7C:
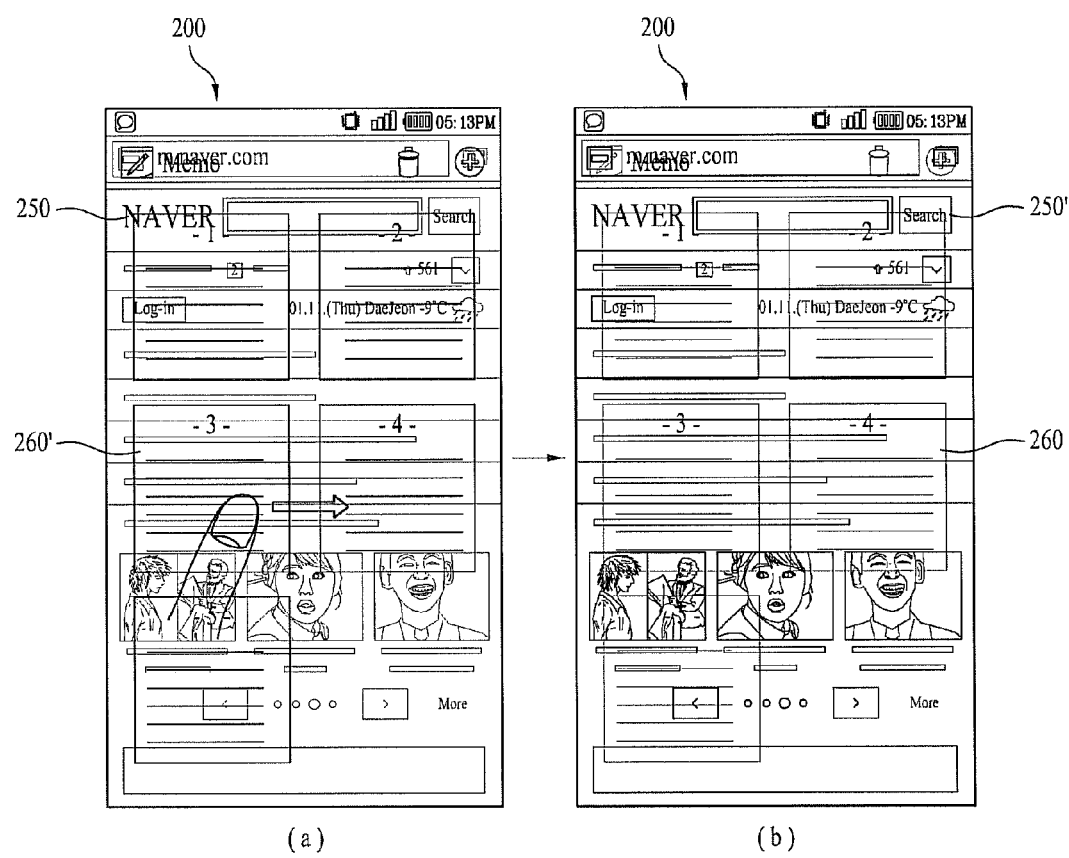
Figure 7D:
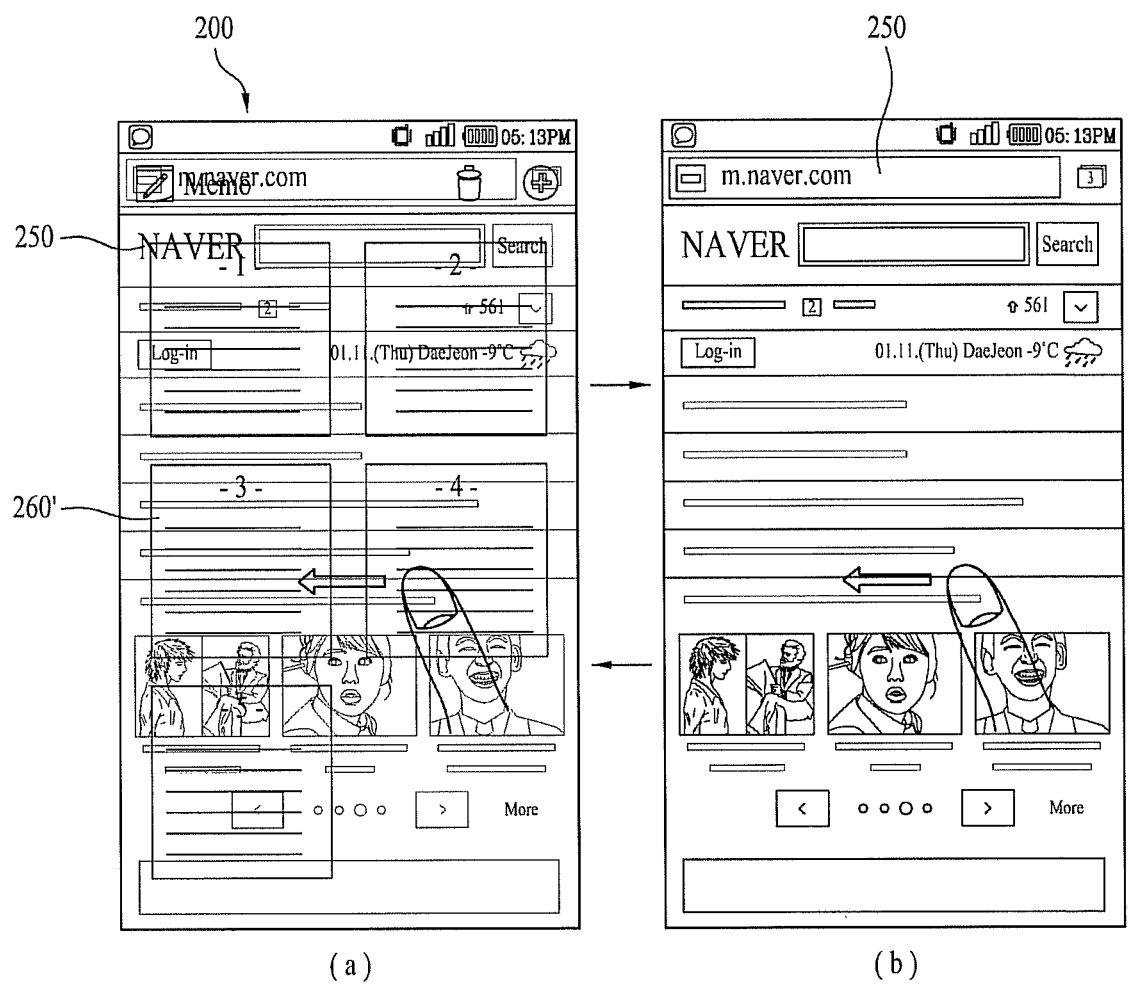

Hence, as shown in FIG. 7C, the display unit 151 is flicked to change the order of the application screens. Here, "flicking" means an operation that the user moves a point touched on the display by the finger having a touch sensor with a short movement in a particular direction. Such flicking includes not only the user's finger movement with touching the display unit 151 but also the user's finger movement to be separated from the display unit 151 in the middle, without touching the display unit 151. Here, the display unit 151 has a touch sensor arranged from one end to the other end thereof.

In the drawings, it is shown that the direction of the flicking is from a left direction to a right direction. Alternatively, it may be set from the right direction to the left direction or from an upward direction to a downward direction.

The order of the front application screen 260' and the rear application screen 250 can be changed. In addition, the semitransparent screen 260' of the front application may be controlled to disappear and only the screen 250 of the rear application may be controlled to show on the display, such that the user can create input even to the screen 250 of the rear application.

To control the screen 250 of the front application to disappear, the flicking mode can be applied. At this time, a flicking direction set to control the screen 250 to disappear may be set different from the flicking direction set to convert the order of the screens, such that the flicking mode for controlling the front application screen 250 to disappear can be distinguished from the flicking mode for the screen order conversion.

Figure 8:
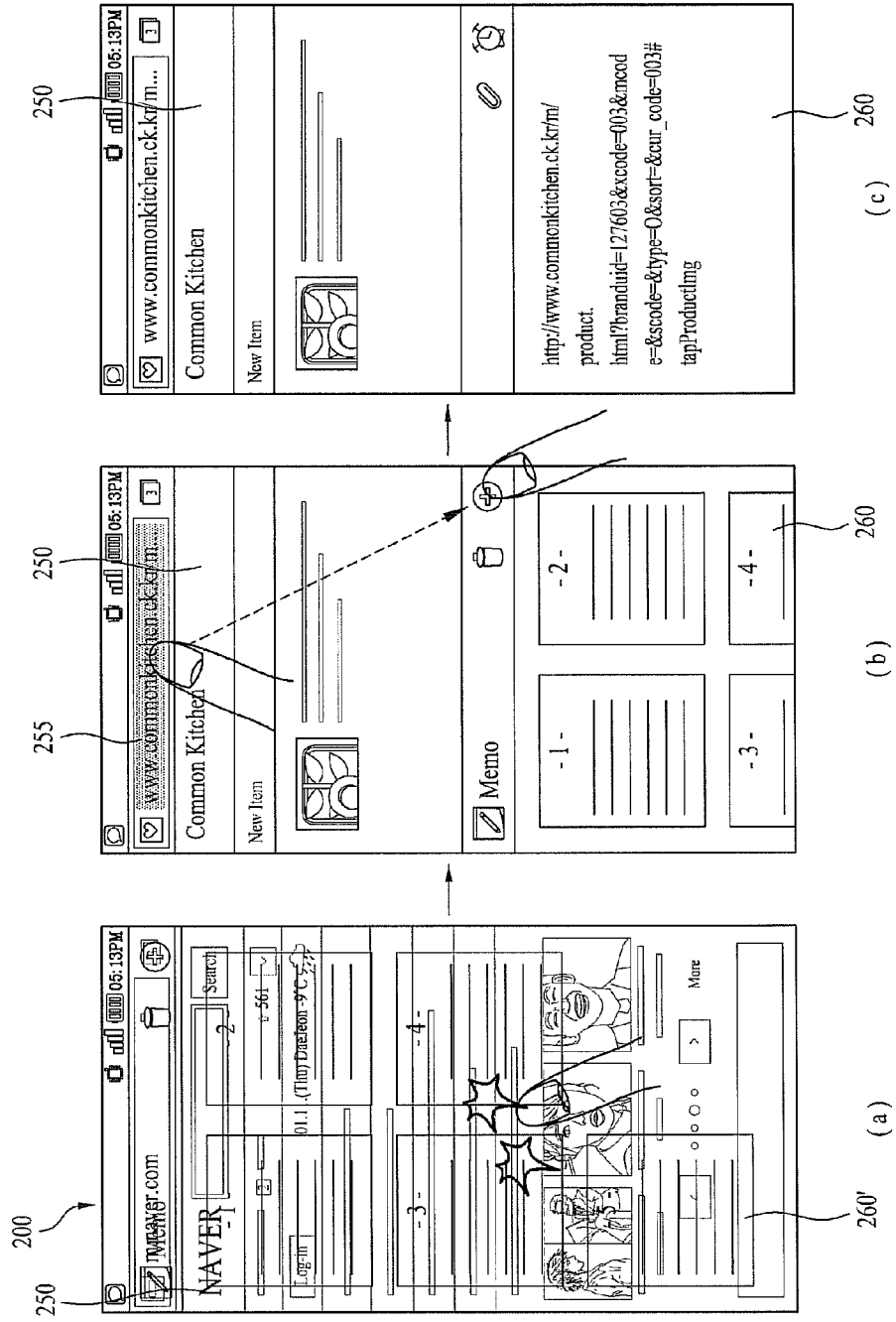
FIG. 8 is a plane diagram illustrating a fifth embodiment of the overlay display according to the method of controlling the mobile terminal.

FIG. 8 is a plane diagram illustrating a fifth embodiment of the overlay display according to the method of controlling the mobile terminal. A first application screen 250 and a second application screen 260 of the overlay display 200 may be controlled to output on screens divided from the display unit 151, respectively. A command of the divided output may be enabled by a double touch mode. Alternatively, various modes can be designated for the divided output command and examples of such various modes can include a button mode or a preset gesture mode.

When the first application screen 250 and the second application screen 260 are displayed on divided sections of the display unit, respectively, input may be enabled to both of the first application screen 250 and the second application screen 260. In addition, the two screens can interact with each other, such that an object selected from one application screen may be moved to the other application screen as shown in FIG. 8 (*b*).

In the drawing, the text on the first application screen 250 is selected and the selected text is moved to the second application screen 260, such that the user can record specific particulars on the second application. The embodiment is not limited thereto and various objects can be moved. Examples of such various objects include images, files and the like.

According to one or more of the embodiments, the plurality of the screens may be displayed on the display unit simultaneously and two processes can be implemented simultaneously or continuously. Accordingly, a new process may be implemented without finishing the process implemented before and the process implementation time can be reduced.

Furthermore, two or more processes may be implemented, in interaction with each other. Accordingly, the inconvenience of completing one process and the next process can be reduced.

Although embodiments have been described with reference to a number of illustrative embodiments thereof, it should be understood that numerous other modifications and embodiments can be devised by those skilled in the art that will fall within the spirit and scope of the principles of this disclosure.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal having a display, comprising:
   displaying a first application, that is currently running on a first screen of the display;
   opening an application list, in response to a user action, that includes a plurality of icons, wherein the plurality of icons includes a first icon representing a specific application, wherein the application list is displayed on the display at an initial position simultaneously with the first application;
   when the first icon and the application list are dragged from the initial position to a first location of the display by a user action, displaying a second application on a second screen of the display while displaying the first application, and overlay-displaying the second screen over the entire first screen;
   when the first icon and the application list are dragged from the initial position to a second location of the display by a user action, displaying at least two indicators, at least one of the two indicators is displayed to identify that the first application is the current application being displayed; and
   while simultaneously displaying the first application and the at least two indicators, receiving a flip gesture on the display, in response to the flip gesture, overlay-displaying the second screen of the second application over the entire first screen of the first application,
   wherein the second screen is displayed in a semitransparent state, and the second screen receives one or more user interactions to generate output that is used as input to the first application.

2. The method of claim 1, wherein the implementing of the second application includes displaying a noticing item on the first screen while implementing the first application and in response to receiving a selection of the tem, implementing the second application.

3. The method of claim 1, wherein the implementing of the second application includes displaying the application list and in response to the user action to drag the first icon from the application list, implementing the second application on the second screen.

4. The method of claim 1, comprising:
   controlling the first screen to disappear and only the second screen of the second application to be displayed, when a transparency of the second screen is adjusted by a user to 0%; and
   controlling the second screen of the second application to disappear and only the first screen of the first application to be displayed, when the transparency of the second screen is adjusted by a user to 100%.

5. The method of claim 1, wherein the first application is a video call, and the second application comprises an image or data file, and the method further comprises:
   transmitting the image or the data file to another terminal of the video call, when the image or the data file is selected from the second screen of the second application.

6. The method of claim 1, wherein the first application is a video call, and the method further comprises:
   sharing the second screen of the second application with another terminal of the video call.

7. The method of claim 1, wherein overlay-displaying the second screen includes displaying the second screen of the second application such that the second screen is perceived to be in front of the first screen of the first application, in a semitransparent state.

8. The method of claim 1, further comprising:
   changing an overlay order of the first screen of the first application and the second screen of the second application.

9. The method of claim 8, wherein changing the overlay order comprises:

displaying a lateral side of an overlay structure by tilting the first screen of the first application and the second screen of the second application; and changing the overlay order by dragging the first screen of the first application or the second screen of the second application.

10. The method of claim 8, wherein changing the overlay order includes changing the overlay order of the first screen and the second screen by providing a flicking movement on the display.

11. The method of claim 1, further comprising:

providing a flicking movement on the display after the overlay-displaying of the second screen;

controlling the second screen of the second application to disappear such that only the first screen of the first application is displayed on the display.

12. The method of claim 11, further comprising:

providing a flicking movement on the display after displaying only the first screen of the first application on the display, displaying the second screen of the second application so as to appear to be in front of the first screen of the first application in a semitransparent state.

13. The method of claim 1, wherein after overlay-displaying the second screen the method further comprises:

separating the display into predetermined sections and displaying the first screen of the first application and the second screen of the second application on the separated sections, respectively.

* * * * *